(12) United States Patent
Strutt et al.

(10) Patent No.: US 10,459,525 B2
(45) Date of Patent: Oct. 29, 2019

(54) GESTURE CONTROL

(71) Applicant: Elliptic Laboratories AS, Oslo (NO)

(72) Inventors: Guenael Strutt, San Francisco, CA (US); Joachim Bjørne, Oslo (NO); Geir Birkedal, Oslo (NO)

(73) Assignee: ELLIPTIC LABORATORIES AS, Oslo (NO)

( * ) Notice: Subject to any disclaimer, the term of this patent is extended or adjusted under 35 U.S.C. 154(b) by 455 days.

(21) Appl. No.: 14/795,125

(22) Filed: Jul. 9, 2015

(65) Prior Publication Data

US 2016/0011672 A1 Jan. 14, 2016

(30) Foreign Application Priority Data

Jul. 10, 2014 (GB) .................................. 1412268.3

(51) Int. Cl.
*G06F 3/01* (2006.01)
*G06F 3/043* (2006.01)
*G06F 3/0488* (2013.01)

(52) U.S. Cl.
CPC .............. *G06F 3/017* (2013.01); *G06F 3/043* (2013.01); *G06F 3/016* (2013.01); *G06F 3/04883* (2013.01); *G06F 2203/04108* (2013.01)

(58) Field of Classification Search
None
See application file for complete search history.

(56) References Cited

U.S. PATENT DOCUMENTS

| 2008/0168290 | A1* | 7/2008 | Jobs | G06F 1/26 713/324 |
| 2009/0058829 | A1* | 3/2009 | Kim | G06F 3/016 345/173 |
| 2012/0243374 | A1* | 9/2012 | Dahl | G06F 3/043 367/93 |
| 2013/0211843 | A1* | 8/2013 | Clarkson | G06F 3/04883 704/275 |
| 2013/0271360 | A1* | 10/2013 | MacDougall | H04M 1/72519 345/156 |

(Continued)

FOREIGN PATENT DOCUMENTS

WO   WO 2009/115799   9/2009
WO   WO 2013/132242   9/2013

OTHER PUBLICATIONS

Wim Fikkert et al., User-evaluated Gestures for Touchless Interactions from a Distance, Dec. 1, 2010, IEEE Computer Society, pp. 153-160 (Year: 2010).*

(Continued)

*Primary Examiner* — Tam T Tran
(74) *Attorney, Agent, or Firm* — Beyer Law Group LLP

(57) ABSTRACT

A method of operating a touchless user interface on an electronic device is disclosed. The electronic device is configured to determine information regarding the position and/or movement of an input object. The method has the steps of: deciding that an engagement gesture has been performed; deciding that a related input gesture has been performed; and carrying out an operation on the device on the basis of the input gesture only if the engagement gesture has been recognized and if the input gesture is one of a subset of possible input gestures determined by the engagement gesture.

34 Claims, 6 Drawing Sheets

(56) References Cited

U.S. PATENT DOCUMENTS

Figure 1:
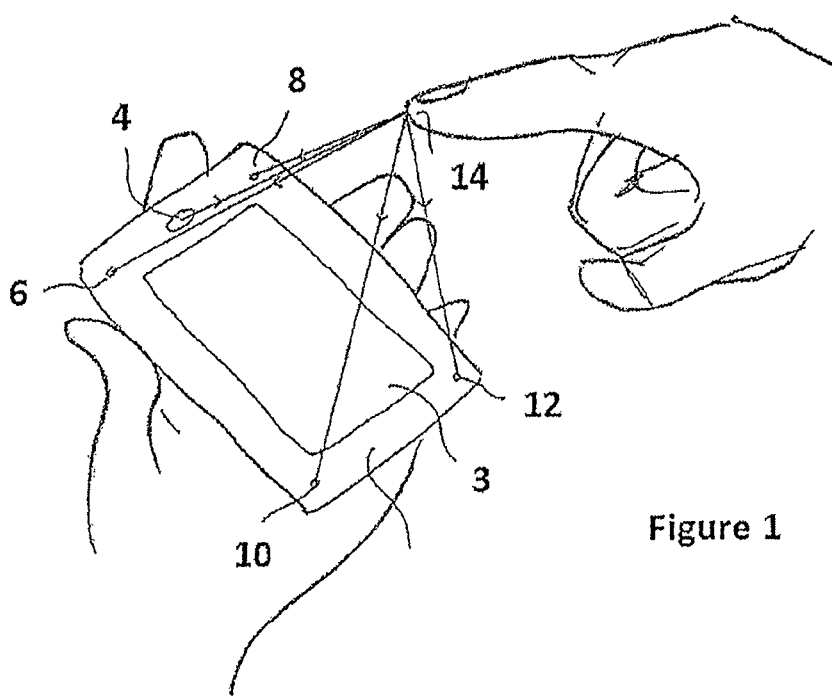

| | | | | |
|---|---|---|---|---|
| 2014/0015804 A1* | 1/2014 | Mongia | ............... | G06F 1/3231 345/175 |
| 2014/0068755 A1* | 3/2014 | King | ............... | G06F 21/53 726/19 |
| 2014/0201666 A1* | 7/2014 | Bedikian | ............... | G06F 3/017 715/771 |
| 2014/0368423 A1* | 12/2014 | Brenckle | ............... | G06F 3/017 345/156 |
| 2015/0193111 A1* | 7/2015 | Kauffmann | ............... | G06F 3/017 715/825 |

OTHER PUBLICATIONS

Daniel R. Schlegel et al., AirTouch: Interacting With Computer System at a Distance, Jan. 1, 2011, IEEE, pp. 1-8 (Year: 2011).*

* cited by examiner

Prior Art

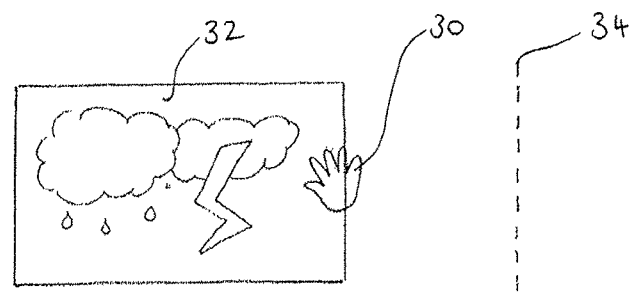
Figure 3a
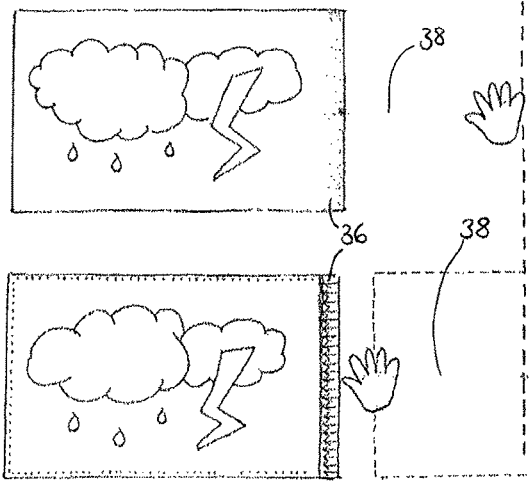
Figure 3b
Figure 3c
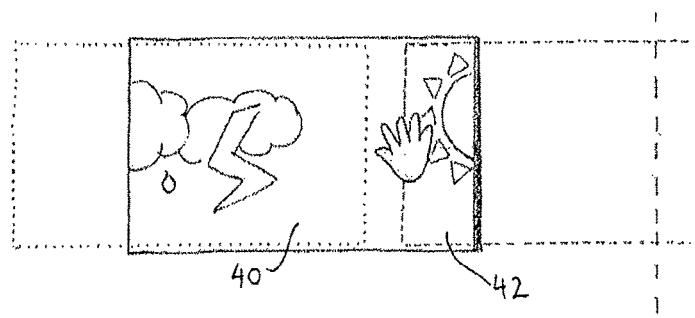
Figure 3d
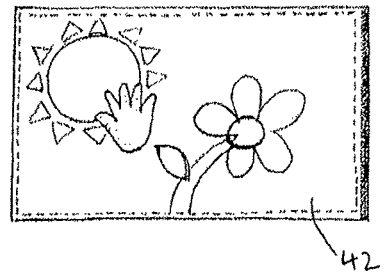
Figure 3e

GESTURE CONTROL

CROSS-REFERENCE TO RELATED APPLICATIONS

This application claims priority to GB Application No. 1412268.3, filed on Jul. 10, 2014 which is incorporated herein by reference in its entirety.

This invention relates to the control of a device using touchless gestures, particularly but not exclusively using an ultrasonic touchless system.

In recent years there has been a trend in consumer electronic devices to move away the use of physical keyboard and button interfaces to more 'natural' interfaces. These are currently based around touch sensitive screens and voice recognition, although increasingly interest is growing in the extra possibilities offered by touchless gesture recognition. While this can be used to imitate traditional input methods, it also allows intuitive movements to be used to control a device, increasing the range of control available. WO 2013/132242 gives examples of possible control gestures for a device. However, proposed touchless systems can still suffer from problems, for example being controlled unintentionally either by background objects or by unintended movement of a hand being interpreted as a control gesture.

The present invention aims to increase the level of control over a touchless device, and when viewed from a first aspect, the invention provides a method of operating a touchless user interface on an electronic device, wherein the electronic device is configured to determine information regarding the position and/or movement of an input object, the method comprising:

deciding that an engagement gesture has been performed;

deciding that a related input gesture has been performed; and carrying out an operation on the device on the basis of the input gesture only if the engagement gesture has been recognised and if the input gesture is one of a subset of possible input gestures determined by the engagement gesture.

The first aspect of the invention extends to an electronic device comprising a touchless user interface and configured to determine information regarding the position and/or movement of an input object, the device being further configured to:

decide that an engagement gesture has been performed;

decide that a related input gesture has been performed; and carry out an operation on the device on the basis of the input gesture only if the engagement gesture has been recognised and if the input gesture is one of a subset of possible input gestures determined by the engagement gesture.

Thus it can be seen that an input gesture is not deemed to have been carried out unless a relevant engagement gesture has already been performed and recognised by the device. The engagement gesture forms an 'unlocking' stage, preparing the device for a user input. This may reduce the number of accidental inputs by a user, as two input stages are required in order for an operation to be carried out—the engagement gesture and the input gesture. In addition, the introduction of engagement gestures associated with specific input gestures may help to reduce the power used by a device, as once an engagement gesture has been recognised, there is a reduced set of possible input gestures, reducing the processing power needed to determine the input gesture.

This may, for example, allow part of the touchless interface to be switched off when a certain engagement gesture is detected.

In an example of such engagement gestures, e.g. to carry out a 'swipe' movement on a device, in order to change an image being displayed, a user may have to cross at least one of the boundaries of a touchless gesture zone in order to complete the engagement gesture and prepare the device for a swipe gesture. In an alternative example, if a user was to carry out a circular movement over one corner of the device, crossing in and out of the touchless gesture zone, this may be an engagement gesture to indicate that the user wishes to use that corner to turn a virtual page of an e-reader application. In this example, touchless sensors in all other corners can be deactivated, as the user has indicated the region in which the gesture will take place.

In a set of embodiments, the method further comprises providing feedback to a user that said engagement gesture has been recognised. Such feedback may be provided to the user once the engagement gesture has been completed, or may alternatively be provided progressively while the user is performing the engagement gesture. This may help the user determine when the engagement gesture has been recognised and therefore when they can perform the input gesture. This in turn aids intuitive learning of how to use the interface. The feedback may comprise one or more of: audio, visual, haptic. The feedback may indicate to a user that the device is ready to process an input gesture. The feedback may for example take the form of an audible 'ping' when the engagement gesture is complete, a continuous brightening of a screen backlight as the engagement gesture is performed, highlighting of an icon on screen, progressive completion of an icon on screen (e.g. a progress bar), movement of icons on screen that will be required, or vibration of the device once the gesture is complete.

In a set of embodiments, the input gesture must be carried out within a predetermined time limit after the engagement gesture has been performed. In a set of embodiments, this time limit is between 5 and 20 seconds. The introduction of a time limit may help to prevent accidental input to the device, as an input gesture performed much later is not processed.

In a set of embodiments, every input gesture must be preceded by an engagement gesture. However, in a set of embodiments the performance of an engagement gesture allows a subset of input gestures to be performed without requiring a new engagement gesture. In a set of embodiments, there is a predetermined time limit after the engagement gesture is performed in which any of the subset of input gestures performed are processed. The time limit may for example be between 5 and 30 seconds. Alternatively, the performance of an engagement gesture may allow any of the subset of input gestures to be performed, with no new engagement gestures needed. For example, repeating the same or a related input gesture may not require a new engagement gesture, for example allowing a user to scroll through a plurality of images, either moving the images left or right, without re-performing the engagement gesture. In a further set of embodiments, a time-out limit is applied after the last gesture of the subset was performed, after which a time-out limit a new engagement gesture is required.

In the embodiments set out above, the subset of gestures could be a single gesture.

In a set of embodiments, the engagement gesture comprises a movement which is the same as the desired input gesture(s) except that it is carried out in a different direction. This may help to increase the ease with which a user learns which engagement gesture is required, as it may be an intuitive extension of the input gesture. In a set of embodiments, the engagement gesture is carried out in the opposite direction to the input gesture. In an alternative set of embodiments, the engagement gesture is carried out perpendicular to the input gesture.

In a set of embodiments, the subset of desired input gestures may comprise only one input gesture for each engagement gesture. This one-to-one relationship between input gesture and engagement gesture may be used to greatly reduce the processing power required, as once the engagement gesture has been recognised there is only one possible input gesture which needs to be processed. However, this may also require a user to learn an engagement gesture for every possible input gesture, increasing the complexity of the system.

While the engagement and input gestures may be distinct and/or different motions carried out by the user, this is not essential. In some sets of embodiments the input gesture is an extension of the engagement gesture in the same direction. It will be appreciated that in such cases the motion of the input object will initially need to be performed such that it qualifies as an engagement gesture before the remainder of the motion is recognised as an input gesture.

Such arrangements are novel and inventive in their own right and thus when viewed from a second aspect, the invention provides a method of operating a touchless user interface on an electronic device, wherein the electronic device is configured to determine information regarding the position and/or movement of an input object, the method comprising:

deciding that an input gesture has been initiated;
providing feedback to the user;
deciding that the input gesture has been performed beyond a threshold; and
carrying out an operation on the device on the basis of the input gesture only if the input gesture has been performed beyond the threshold.

The second aspect of the invention extends to an electronic device comprising a touchless user interface and configured to determine information regarding the position and/or movement of an input object, the device being further configured to:

decide that an input gesture has been initiated;
provide feedback to the user;
decide that the input gesture has been performed beyond a threshold; and
carry out an operation on the device on the basis of the input gesture only if the input gesture has been performed beyond the threshold.

Thus it will be seen by those skilled in the art that rather than requiring an engagement gesture and distinct input gesture as in accordance with some embodiments of the previous aspect of the invention, the user can perform one dynamic and intuitive motion. The first part of the motion may alert the device that a user is performing a gesture and it can then be responsive to the second part of the motion and act accordingly. The feedback advantageously allows the user to see that the device has detected their gesture and encourages the user to continue performing the gesture in order to get the device to carry out the desired operation.

This may avoid a user's perception of a delay between beginning a motion and when the device begins to respond with an appropriate action.

As previously, the feedback could be discrete or progressive and could take any convenient form. In a set of embodiments, the feedback comprises a graphical user interface element that provides an indication that the device has detected that the input gesture has been initiated. In some such embodiments, the graphical user interface element provides an indication of the input gesture's progress towards the threshold.

In a set of embodiments of either aspect of the invention, the input gesture is discrete, i.e. the entire input gesture must be completed before any action is taken by the device. In an alternative set of embodiments, the input gesture is continuous, i.e. the device begins to react before the entire input gesture is completed, for example when scrolling, albeit after the threshold is reached in the second aspect of the invention.

Additionally or alternatively, the subset of desired input gestures may comprise a plurality of input gestures for each engagement gesture. The input gestures may be grouped by the element of the device being controlled, for example using a certain engagement gesture to unlock a graphical user interface element for movement, or a different engagement gesture to activate an application.

The touchless user interface may take any form, for example camera-based or electromagnetic field-based. However, in a set of embodiments, the touchless user interface is an acoustic system, preferably an ultrasonic system. In a set of embodiments, the system comprises at least one of: transmitters for transmitting signals; receivers for receiving reflections of the transmitted signals; and a processor for determining information regarding the position and/or movement of said input object from said reflected signals to determine whether a particular gesture has been carried out.

In a set of embodiments, the transmitted signals and received signals are used to calculate channel impulse responses. These may further be combined to form a matrix of channel impulse responses, with the impulse response from consecutive time frames adjacent to one another, known as impulse response images. In a set of embodiments, the impulse response images may be analysed to determine whether a gesture has been carried out.

Figure 2A:
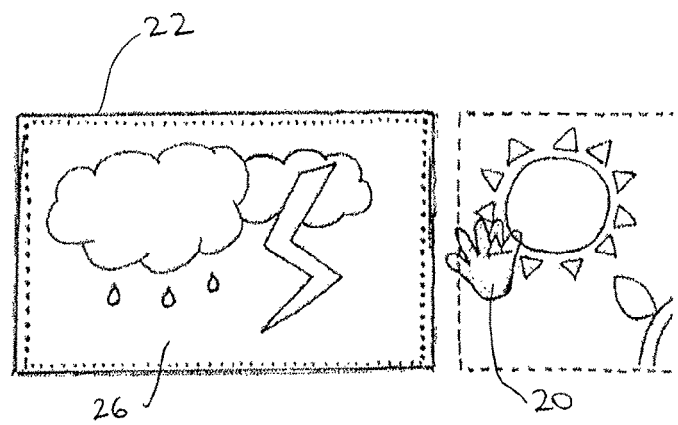
Figure 2B:
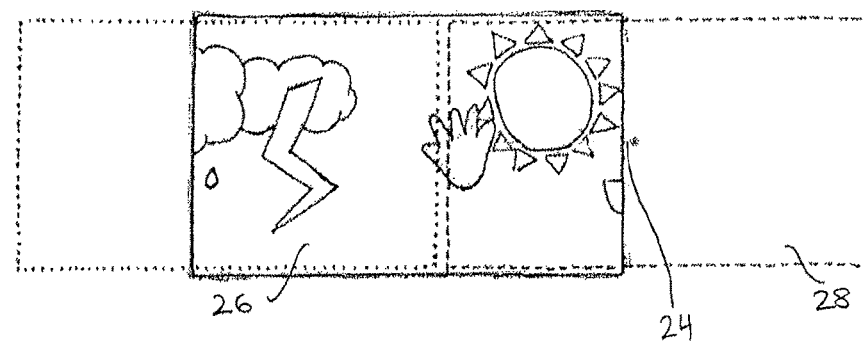
Figure 2C:
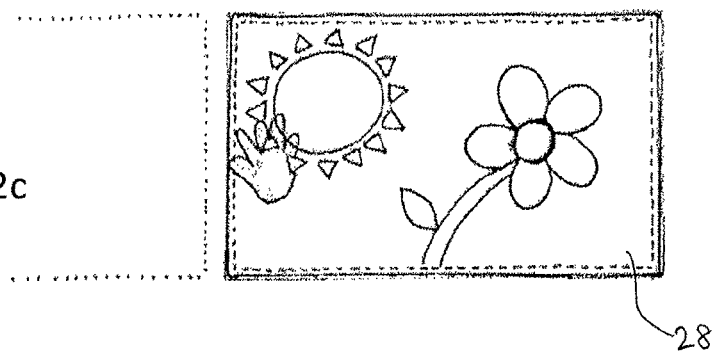
Figure 4:
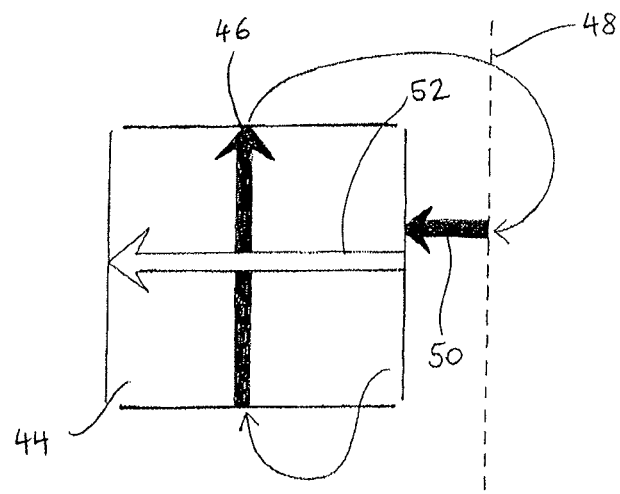
Figure 5:
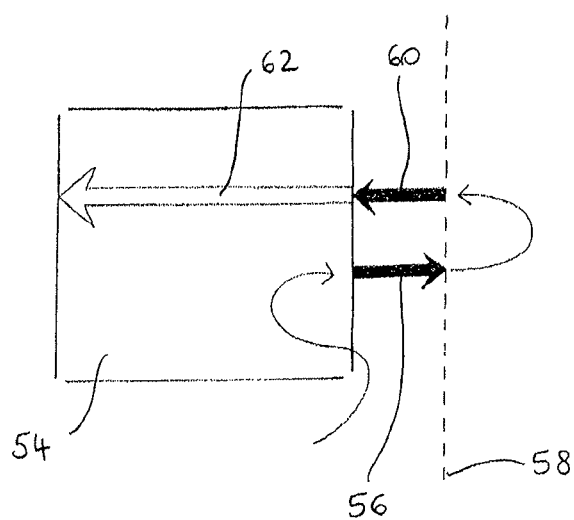
Figure 6:
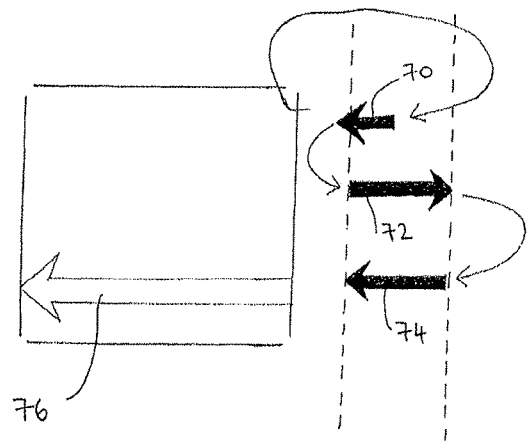
Figure 7:
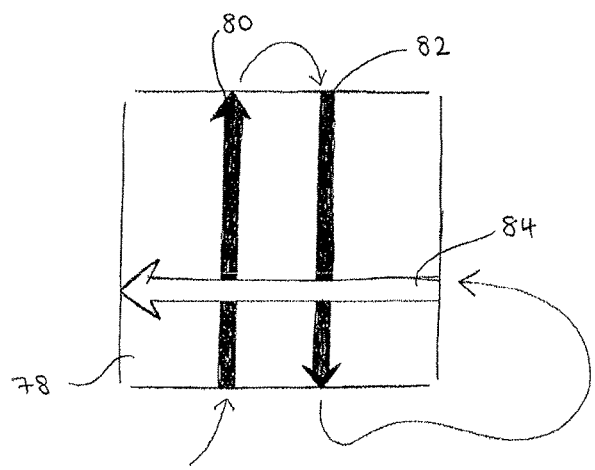
Figure 8:
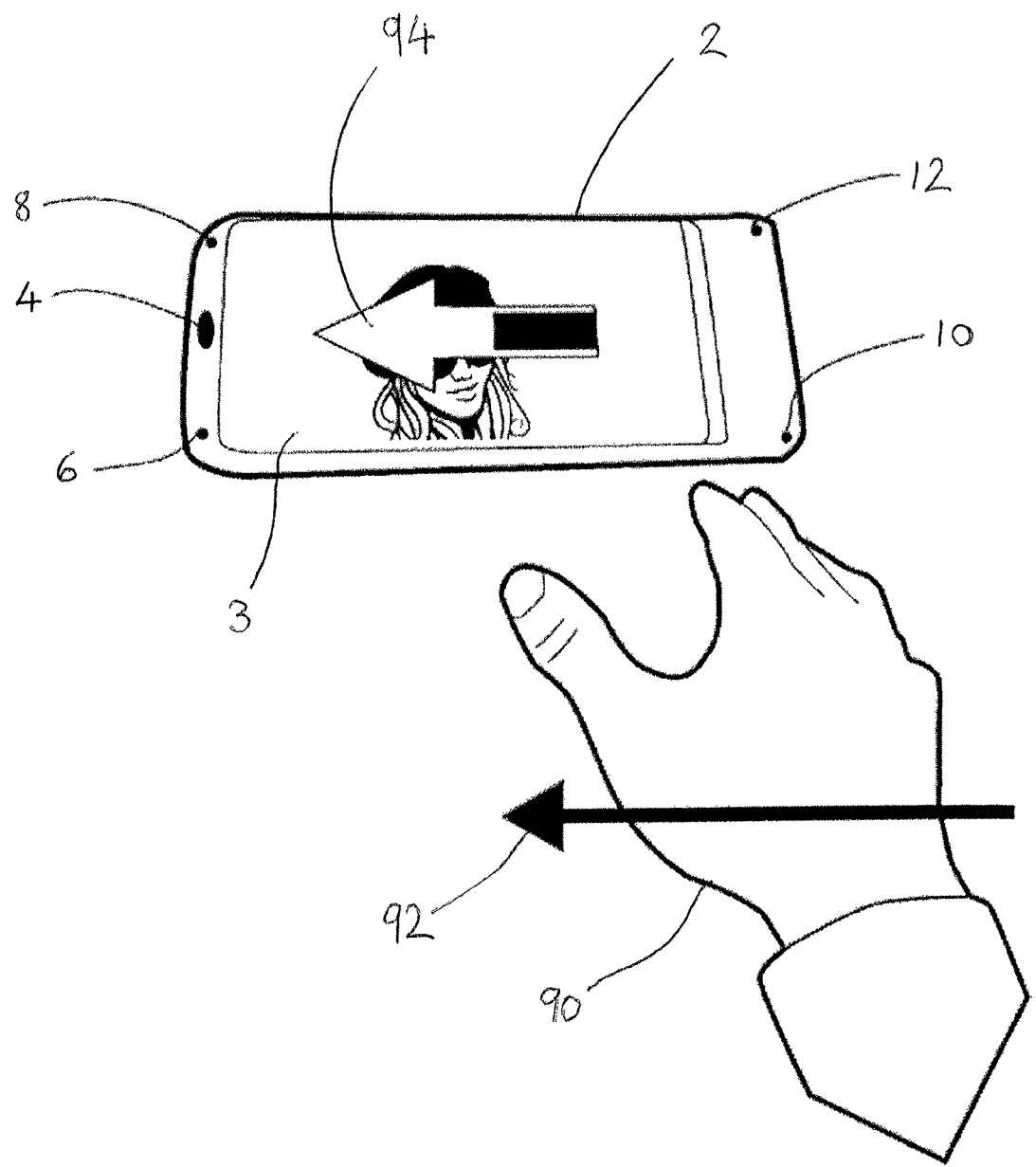

Certain embodiments of the invention will now be described, by way of example only, with reference to the accompanying drawings in which:

FIG. 1 shows a touchless gesture system;
FIGS. 2a-2c show a prior art form of gesture control;
FIGS. 3a-3e show an exemplary engagement gesture and input gesture embodying the invention;
FIG. 4 shows an engagement gesture in accordance with the invention;
FIG. 5 shows an alternative engagement gesture in accordance with the invention;
FIG. 6 shows another engagement in accordance with the invention;
FIG. 7 shows another engagement gesture in accordance with the invention;
FIG. 8 shows a combined engagement and input gesture in accordance with the invention.

FIG. 1 shows an illustration of the basic principles of a touchless detection system. An electronic device such as a smart phone 2 has a touch screen 3 taking up most of the front surface. Around the touch screen 3 are arranged an ultrasonic transmitter 4 and four ultrasonic receivers 6, 8, 10, and 12. In this embodiment, the respective transducers are provided within the body of the phone 2 but corresponding apertures are provided in the front glass layer to allow the air-borne ultrasound to reach them. However, this is not essential, and the transducers may alternatively be on the rear of the device or below a complete front glass layer.

A signal generator (not shown) generates signals at ultrasonic frequencies which are converted to ultrasonic waves by an ultrasonic transmitter 4. These waves bounce off the finger 14 to be tracked, as well as bouncing off any other obstacles in the vicinity. The reflected energy is received by one or more ultrasound receivers 6, 8, 10, 12 which convert the energy back into analogue electrical signals which are passed to a processor (not shown).

The received signals are then processed to calculate the position and movement of the finger 14. Further exemplary details of how this is carried out may be found in WO 2009/115799.

The ultrasonic signal might be a spike or a chirp of increasing or decreasing frequencies. The emitted signal and echoes can be used to estimate the 'channel impulse response', that is the response in terms of echoes produced by the environment ('the channel') encountered by the ultrasound burst. If the emitted signal were a pure impulse, then the received signal would be the impulse response. However if the emitted signal is not such a theoretical pulse (but rather a chirp, for example), the channel impulse response can be calculated from the received signal, using knowledge of the actual emitted signal, to work out what the response would have been had a hypothetical instantaneous pulse been used. Multiple successive impulse responses are preferably analysed together by composing them into an impulse response "image", in which consecutive, discretely-sampled impulse responses are aligned side-by-side to form a two-dimensional array (or image if the array values are represented as greyscale pixels). The impulse responses may alternatively be combined to form a 3D image.

As described in WO 2009/115799, the impulse response images can then be analysed to look for patterns which correspond to movements of the finger by applying a series of filters to the image and determining the strongest match. When a pattern corresponding to a movement is recognised with a certain confidence, this can be acknowledged as a gesture, and the device can react accordingly. Different patterns correspond to different gestures, allowing a device to determine which gesture has been carried out, and to react accordingly.

Of course other techniques could be used instead, e.g. cameras which produce a three-dimensional image of the hand.

FIGS. 2a to 2c demonstrate a prior art form of gesture control. In this example, the hand 20 moves across in front of the screen 22 in order to change the image displayed on the screen. The hand 20 moves along a line 24, moving from being off to one side of the screen to being above the screen. As the hand 20 moves along this line, the images 26 and 28 both move in the same direction at a similar speed. This has the effect of the hand appearing to drag the image 28 onto the screen 22, and pushing the image 26 off the screen 22. The overall effect is seen in FIG. 2c, which shows the image 28 filling the screen 22. This form of gesture control can be simple and intuitive, but it can lead to unintentional device control, as a user may move their hand over the screen in this manner without intending to change the on-screen image. It is therefore beneficial to introduce an engagement gesture, such that the input gesture is less likely to be confused with ordinary hand movements.

FIGS. 3a to 3e demonstrate a touchless gesture control in accordance with the invention. This involves the use of an engagement gesture in order to change the image on the screen 32. The user's hand 30 starts at the edge of the screen 32, on the side from which the image will be changed (see FIG. 3a). However, rather than moving directly across the screen 32, the hand 30 initially moves away from the screen 32. This triggers potential recognition of the engagement gesture by the device, which is indicated to the user by a change in the colour of the edge 36 of the screen 32 (FIG. 3b) which brightens as the hand moves away. Once the hand 30 has passed a predetermined point 34, the edge 36 reaches full brightness to indicate that the engagement gesture has been recognised and the device is ready to receive a touchless input. The user may then move the hand back towards the screen along line 38 (FIG. 3c). Once the hand 30 reaches the edge 36 of the screen 32, scrolling can begin. The hand can then move across the screen, operating a control gesture as seen in FIGS. 2a to 2c and pushing image 40 off the screen 32 while pulling image 42 on to the screen 32 (FIG. 3d). Once the hand 30 has moved a set distance across the screen 32, the image 42 is pulled fully onto the screen 32 (FIG. 3e).

FIGS. 4 to 8 demonstrate alternative engagement gestures.

FIG. 4 demonstrates an engagement gesture which replicates the input gesture, but is carried out partly in a direction perpendicular to that of the input gesture. The engagement gesture is demonstrated with black arrows, and the input gesture is demonstrated with white arrows, which indicate the movement of a hand. The hand initially moves in one direction across the screen 44, as indicated by arrow 46. Once the hand has reached an upper edge of the screen 44, it can be moved in any manner to the right hand side of the screen 44, in preparation for the input gesture. The hand must move past a predetermined distance 48, before moving towards the screen 44 along arrow 50. This completes the engagement gesture, and any further movement across the screen 44 along arrow 52 is taken as the input gesture, and causes the display of the screen 44 to change.

FIG. 5 demonstrates an alternative engagement gesture. In this example, the engagement gesture requires a hand to move away from the screen 54 along a path 56 until it passes a predetermined point 58. The hand must then return towards the screen 54 along a path 60. At this point the engagement gesture is complete, and the device is ready to determine an input gesture comprising the hand moving across the screen 54 along the arrow 62, carrying out an input gesture.

The engagement gesture shown in FIG. 6 is a version of that in FIG. 5 with increased complexity. In this example, there are two limiting distances 64 and 66, both of which are on the same side of the screen 68. These provide the limits within which the engagement gesture must be carried out. The engagement gesture requires the hand to follow the three arrows 70, 72, 74, which cross the inner limit 64, then the outer limit 66, before crossing the inner limit 64 for a second time. Once the inner limit 64 has been crossed a second time, the engagement gesture has been completed, and the user can carry out the swipe motion 76, changing the display on the screen 68.

Another example of an engagement gesture is shown in FIG. 7. The hand must cross the screen 78 twice, both in directions perpendicular to that of the input gesture, in order to complete the engagement gesture. The required movements are demonstrated by arrows 80 and 82. The hand must cross from the bottom to the top of the screen 78, before returning to the bottom. Any movement which is not directly over the screen is not relevant to the gesture, and the hand can move in any manner at these times, provided it continues the engagement gesture or begins the input gesture within a specified time frame. Once the engagement gesture is completed, the swipe movement 84 can be carried out across the screen, causing a change in the display.

FIG. 8 shows a combined engagement and input gesture in accordance with aspects of the invention. The hand 90 is moved from right to left across the touch screen 3 as indicated by the arrow 92. The motion is detected by the ultrasonic receivers 6, 8, 10, and 12 as outlined previously. Once the device has determined that the user is attempting to perform a swipe gesture, a GUI arrow 94 is displayed on the touch screen 3 and begins to "fill up" from right to left in real-time in order to indicate to the user that the device 2 has recognised that the user may be initiating an input. The GUI arrow 94 indicates that they must continue performing the right to left motion in order to completely "fill" the arrow before the device 2 will change the display.

While each of these exemplary gestures are demonstrated on a movement from right to left across a screen, they are equally applicable for movements in all directions across a screen, by being rotated accordingly, and can also be applied to non-swipe gestures across a screen. These gestures may for example be a pinch, a circle, an approach/retreat from the screen or a twist. These gestures may for example cause on-screen objects to change size, shape or colour, or may cause different functionality within an application, or cause different applications to open or close depending on the input gesture which is determined WO 2013/132242 gives examples of different touchless gestures which can be used for input, and different situations in which they could be used. However, these are simply examples of the possible gestures, and are not limiting to this application.

The invention claimed is:

1. A method of operating a touchless user interface on an electronic device having a screen, the method comprising the electronic device:
   determining information regarding a movement of an input object in a touchless gesture input zone;
   determining that said movement of the input object represents an engagement gesture which has been performed and that has crossed at least one boundary of the touchless gesture input zone at a point which is a predetermined lateral distance from an edge of said screen;
   determining that a related input gesture has been performed; and
   carrying out an operation on the device on the basis of the input gesture only if the engagement gesture has been recognised and if the input gesture is one of a subset of possible input gestures determined by the engagement gesture.

2. The method as claimed in claim 1 further comprising providing feedback to a user that said engagement gesture has been recognized.

3. The method as claimed in claim 2 wherein the feedback is provided to the user once the engagement gesture has been completed.

4. The method as claimed in claim 2 wherein the feedback is provided progressively while the user is performing the engagement gesture.

5. The method as claimed in claim 4 wherein the feedback comprises continuous brightening of a screen backlight as the engagement gesture is performed.

6. The method as claimed in claim 4 wherein the feedback comprises progressive completion of an icon on a screen of the device.

7. The method as claimed in claim 2 wherein the feedback comprises visual feedback.

8. The method as claimed in claim 2 wherein the feedback comprises audio feedback.

9. The method as claimed in claim 2 wherein the feedback comprises haptic feedback.

10. The method as claimed in claim 2 wherein the feedback indicates to the user that the device is ready to process an input gesture.

11. The method as claimed in claim 2 wherein the feedback comprises highlighting an icon on a screen of the device.

12. The method as claimed in claim 2 wherein the feedback comprises a movement of at least one icon on a screen of the device.

13. The method as claimed in claim 2 wherein the feedback comprises a vibration of the device once the engagement gesture is complete.

14. The method as claimed in claim 1 wherein the input gesture must be carried out within a predetermined time limit after the engagement gesture has been performed.

15. The method as claimed in claim 14 wherein the time limit is between 5 and 20 seconds.

16. The method as claimed in claim 1 wherein every input gesture must be preceded by the engagement gesture or a further engagement gesture.

17. The method as claimed in claim 1 wherein the performance of an engagement gesture allows a subset of input gestures to be performed.

18. The method as claimed in claim 17 wherein any of the subset of input gestures performed are processed within a predetermined time limit after the engagement gesture is performed.

19. The method as claimed in claim 17 wherein a time-out limit is applied after a last gesture of the subset was performed, and after said time-out limit a new engagement gesture is required.

20. The method as claimed in claim 17 wherein the subset of gestures is a single gesture.

21. The method as claimed in claim 1 wherein the engagement gesture comprises a movement which is the same as the desired input gesture(s) except that it is carried out in a different direction.

22. The method as claimed in claim 21 wherein the engagement gesture is carried out in the opposite direction to the input gesture.

23. The method as claimed in claim 21 wherein the engagement gesture is carried out perpendicular to the input gesture.

24. The method as claimed in claim 1 wherein the subset of desired input gestures may comprise only one input gesture for each engagement gesture.

25. The method as claimed in claim 1 wherein the input gesture is an extension of the engagement gesture in the same direction.

26. The method as claimed in claim 1 wherein the input gesture is discrete.

27. The method as claimed in claim 1 wherein the input gesture is continuous.

28. The method as claimed in claim 1 wherein the subset of desired input gestures may comprise a plurality of input gestures for each engagement gesture.

29. The method as claimed in claim 1 wherein the touchless user interface is an acoustic system.

30. The method as claimed in claim 29 wherein the acoustic system is an ultrasonic system.

31. The method as claimed in claim 29 wherein the acoustic system comprises at least one of: transmitters for transmitting signals; receivers for receiving reflections of the transmitted signals; and a processor for determining information regarding the position and/or movement of said input object from said reflected signals to determine whether a particular gesture has been carried out.

32. The method as claimed in claim 31 wherein the transmitted signals and received signals are used to calculate channel impulse responses.

33. The method as claimed in claim 32 wherein the calculated channel impulse responses are combined into a matrix of channel impulse responses.

34. The method as claimed in 33 wherein the matrix of channel impulse responses is analysed to determine whether a gesture has been carried out.

* * * * *